US010037201B2

(12) United States Patent
Herzi (10) Patent No.: US 10,037,201 B2
(45) Date of Patent: Jul. 31, 2018

(54) SECURE LIVE MEDIA BOOT SYSTEM (71) Applicant: Dell Products L.P., Round Rock, TX (US)

(72) Inventor: Dirie N. Herzi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 63 days.

(21) Appl. No.: 15/054,630

(22) Filed: Feb. 26, 2016

(65) Prior Publication Data
US 2017/0249133 A1   Aug. 31, 2017

(51) Int. Cl.
G06F 9/445    (2018.01)
G06F 8/61     (2018.01)
G06F 9/4401   (2018.01)
G06F 21/60    (2013.01)

(52) U.S. Cl.
CPC ............ G06F 8/63 (2013.01); G06F 9/4408 (2013.01); G06F 21/602 (2013.01)

(58) Field of Classification Search
None
See application file for complete search history.

(56) References Cited

U.S. PATENT DOCUMENTS

| | | | | |
|---|---|---|---|---|
| 7,877,809 B1 * | 1/2011 | Sutton | .................. | G06F 21/575 713/188 |
| 8,560,823 B1 * | 10/2013 | Aytek | .................... | G06F 8/665 713/191 |
| 8,688,967 B2 * | 4/2014 | Smith | ..................... | G06F 21/57 713/1 |
| 2005/0005076 A1 * | 1/2005 | Lasser | ....................... | G06F 8/60 711/154 |
| 2005/0144476 A1 * | 6/2005 | England | ............... | G06F 9/4405 726/17 |
| 2008/0052526 A1 * | 2/2008 | Dailey | .................... | G06F 21/32 713/186 |
| 2012/0198514 A1 * | 8/2012 | McCune | .................. | G06F 21/85 726/1 |
| 2012/0233449 A1 * | 9/2012 | Thibadeau | ............ | G06F 21/575 713/2 |
| 2014/0095886 A1 * | 4/2014 | Futral | ................... | G06F 21/572 713/187 |

(Continued)

Primary Examiner — Wei Zhen
Assistant Examiner — Binh Luu
(74) Attorney, Agent, or Firm — Haynes and Boone, LLP (57) ABSTRACT A secure live media boot system includes a BIOS that is coupled to a storage subsystem and a non-volatile memory system. The BIOS receives an operating system image. Prior to installing an operating system on a computing device using with the operating system image, the BIOS performs a first measurement action on the operating system image to produce a first operating system measurement that it stores in the non-volatile memory system. The BIOS also stores a read-only version of the operating system image on the storage subsystem. The BIOS subsequently receives a request to install the operating system on the computing device and, in response, performs a second measurement action on the operating system image in order to produce a second operating system measurement. If the BIOS determines that the second operating system measurement matches the first operating system measurement, the BIOS installs the operating system on the computing device.

20 Claims, 5 Drawing Sheets (56) References Cited

U.S. PATENT DOCUMENTS

| | | | |
|---|---|---|---|
| 2014/0215196 A1* | 7/2014 | Berlin | G06F 21/572 |
| | | | 713/2 |
| 2014/0310816 A1* | 10/2014 | Vrhel | G06F 21/121 |
| | | | 726/26 |
| 2014/0351571 A1* | 11/2014 | Jacobs | G06F 21/575 |
| | | | 713/2 |
| 2015/0134977 A1* | 5/2015 | Henry | G06F 21/572 |
| | | | 713/194 |
| 2015/0134978 A1* | 5/2015 | Henry | G06F 21/572 |
| | | | 713/194 |
| 2015/0356299 A1* | 12/2015 | Barkelew | G06F 21/575 |
| | | | 713/2 |
| 2016/0162689 A1* | 6/2016 | Martinez | G06F 9/4401 |
| | | | 726/1 |
| 2017/0085383 A1* | 3/2017 | Rao | H04L 9/3234 |
| 2017/0093582 A1* | 3/2017 | Keidar | G06F 21/575 |
| 2017/0097828 A1* | 4/2017 | Kim | G06F 9/4406 |

\* cited by examiner

SECURE LIVE MEDIA BOOT SYSTEM

BACKGROUND

The present disclosure relates generally to information handling systems, and more particularly to a secure live media boot system for booting information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, desktop computing devices, laptop/notebook computing devices, and/or a variety of other computing devices known in the art, are sometimes used to perform high-vulnerability tasks such as Internet banking and other tasks that require relatively high levels of security so that sensitive information communicated using the computing device is not compromised and/or unauthorized access to secure systems achieved. Conventionally, such levels of high security are achieved by ensuring the operating system on the computing device includes up-to-date "patches" for any known vulnerabilities, providing virus scanning software on the computing device to determine whether the computing device may be compromised by any computer viruses, using conventional secure booting methods to boot the computing devices, and hoping that the computing device is not under attack from a new security threat that is able to circumvent the high-security procedures discussed above. In one example, users may utilize conventional live media such as, for example, Linux LiveCD or Read-only LiveUSB, to perform the secure booting discussed above. Such conventional live media booting systems provide external media such as a compact disc (CD) or Universal Serial Bus (USB) drive that stores a complete bootable computer installation (e.g., in an .iso file) that includes an operating system for the computing device. In order to boot, the computing device copies the computer installation from the external media to the computing device memory (rather than being loaded from a hard drive or other mass storage device), which allows the user to run the operating system for any purpose without installing it or making changes to the computing device configuration.

However, such conventional live media booting systems require that the user have access to the live media whenever a secure environment is desired. Furthermore, computer viruses have been developed that are very successful in hiding from virus scanners, while also being very difficult to remove from the computing device. Users may inadvertently install such computer viruses when installing seemingly harmless readers or games on the computing device, resulting in malicious rootkits that are resident in the kernel of the computing device and that enable access to the computing device (or areas of its software) that would otherwise not be allowed to an unauthorized user, while at the same time masking the existence of the rootkit or maliciously modified software. Stolen or guessed passwords can result in the installation of such rootkits on the computing device as well. Conventional systems such as secure booting systems available from MICROSOFT® Corporation of Redmond, Wash., United States, (e.g., MICROSOFT® Secure Boot) were expected to reduce the use of such rootkits, but vulnerabilities in the Unified Extensible Firmware Interface (UEFI) have been exploited to install rootkits despite the new security. Furthermore, computer viruses resident in the operating system can exist in the secure boot operating system because the user of the computing device has allowed malicious software to run.

Accordingly, it would be desirable to provide an improved secure live media boot system.

SUMMARY

According to one embodiment, an Information Handling System (IHS) includes a mass storage device; a non-volatile memory subsystem; an external device connector; and a Basic Input/Output System (BIOS) that is coupled to the mass storage device, the non-volatile memory subsystem, and the external device connector, wherein the BIOS is configured to: receive an operating system image from an external device that is coupled to the external device connector; perform a first measurement action on the operating system image prior to performing an installation of an operating system associated with the operating system image to produce a first operating system measurement; store the first operating system image measurement in the non-volatile memory subsystem; store the operating system image as a read-only operating system image on the mass storage device; receive a request to install the operating system provided by the operating system image subsequent to storing the first operating system image measurement in the non-volatile memory subsystem and, in response, perform a second measurement action on the operating system image in order to produce a second operating system measurement; and determine that the second operating system measurement matches the first operating system measurement and, in response, perform an installation of the operating system associated with the operating system image.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
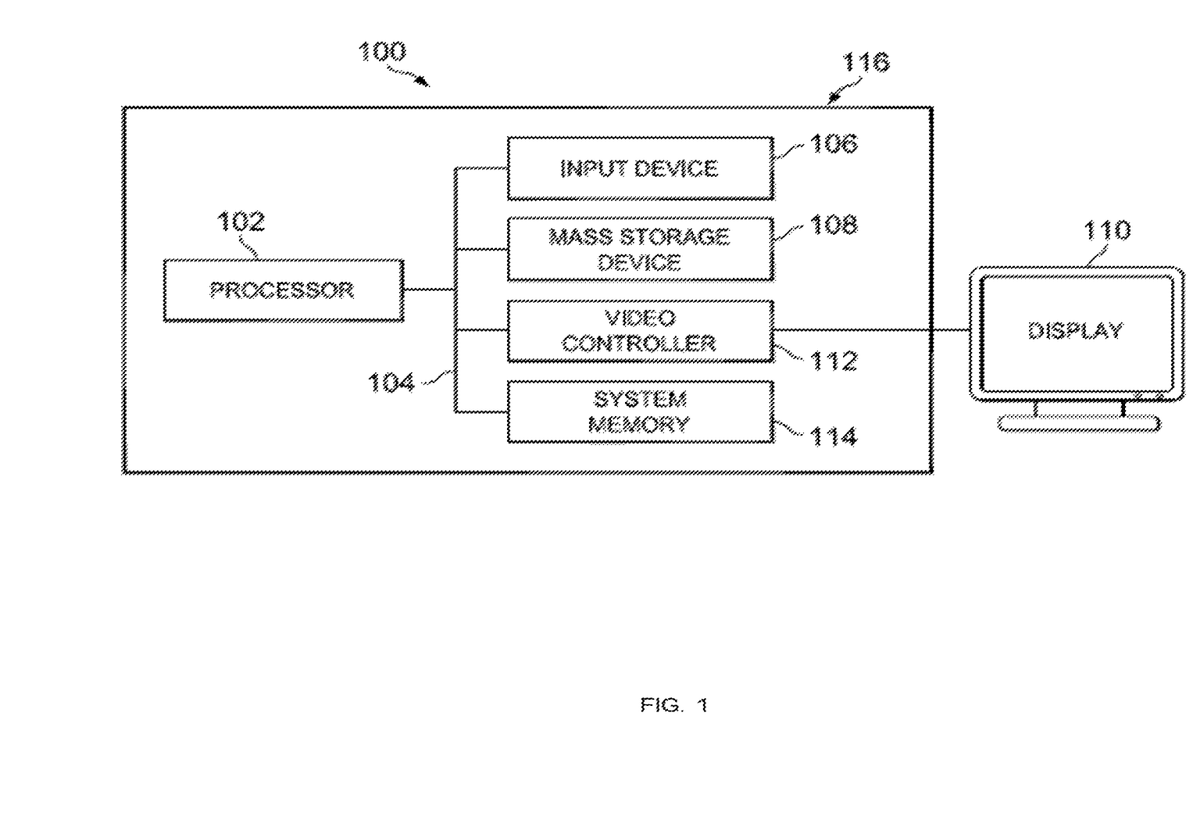
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
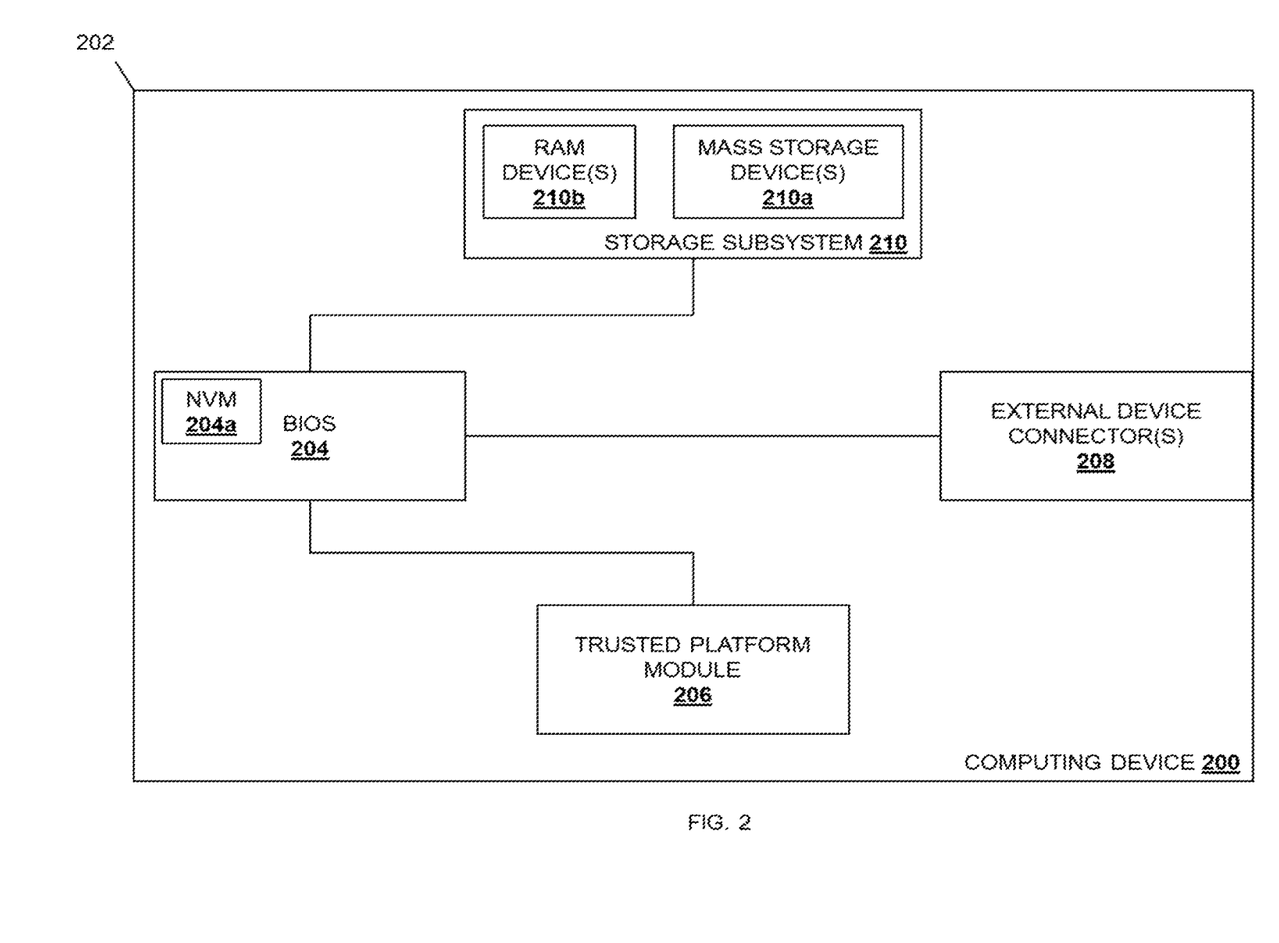
FIG. 2 is a schematic view illustrating an embodiment of a computing device including the secure live media boot system of the present disclosure.

Referring now to FIG. 2, an embodiment of a secure live media boot system is illustrated provided in a computing device 200. In an embodiment, the computing device 200 may be the IHS 100 discussed above with reference to FIG. 1 and/or may include some or all of the components of the IHS 100. In specific embodiment, the computing device 200 may be a desktop computing device, a laptop/notebook computing device, a tablet computing device, a mobile phone, and/or other computing devices known in the art. Furthermore, while the secure live media boot system is discussed below as being provided in a specific computing device 200, one of skill in the art in possession of the present disclosure will recognize that a variety information handling systems (e.g., servers, switching or other networking devices, storage systems, etc.) will benefit from the teachings of the present disclosure and thus will fall within its scope. In the illustrated embodiment, the computing device 200 includes a chassis 202 that houses the components of the computing device 200, only some of which are illustrated in FIG. 1. One of skill in the art in possession of the present disclosure will recognize that a variety of other components may be substituted for the components illustrated in FIG. 2 to provide the functionality discussed below, and additional components may be included in the chassis 202 to provide a variety of conventional computing device functions depending on the functionality desired for the computing device 200.

For example, the chassis 202 may house a Basic Input/Output System (BIOS) 204 that may provide firmware that is configured to perform hardware initialization during a boot process for the computing device 200, provide runtime services for operating systems and programs provided on the computing device 200, and/or perform a variety of other BIOS functionality known in the art. In some embodiments, the BIOS 204 may be provided by a Unified Extensible Firmware Interface (UEFI) system while remaining within the scope of the present disclosure. Thus, while UEFI is known in the art as a specification that has been provided to replace BIOS and that defines a software interface between an operating system and platform firmware provided on computing devices, the discussions of the BIOS functionality below are intended to encompass UEFI system functionality as well (i.e., a UEFI system may provide the BIOS 204 that performs the functionality discussed below while remaining within the scope of the present disclosure.) In some embodiments, the BIOS 204 may include or be coupled to a non-volatile memory (NVM) 204a that is used to store operating system measurement(s) as discussed in further detail below. However, in some embodiments, the non-volatile memory 204a may be omitted or otherwise not used to store the operating system measurement(s) discussed below. For example, in some embodiments, the chassis 202 may house a Trusted Platform Module (TPM) 206 that is coupled to the BIOS 204 and that provides a non-volatile memory that is used to store the operating system measurement(s) discussed below. In such embodiments, the Trusted Platform Module may include a secure cryptoprocessor that is configured to store cryptographic keys that protect information including the operating system measurement(s) discussed below.

The chassis 202 may also house one or more external device connectors 208 that may be accessible on an external surface of the computing device 200. In an embodiment, the external device connector(s) 208 may include peripheral devices connectors such as compact disc drive connectors, hard disk drive connectors, solid state drive connectors, universal serial bus (USB) drive connectors, networking connectors (e.g., Ethernet connectors), and/or a variety of other external device connectors known in the art. The external device connectors 208 may be coupled to the BIOS 204, as well as processing systems (not illustrated, but which may include the processor 102 discussed above with reference to FIG. 1) and/or other computing device subsystems known in the art. The chassis 202 may also house a storage subsystem 210 that is coupled to the BIOS 204. In the illustrated embodiment, the storage subsystem 210 may include one or more mass storage device(s) 210a that may be the mass storage device 108 discussed above with reference to FIG. 1. In specific embodiments, the mass storage device 210a may include hard disk drive(s), solid state drive(s), and/or other mass storage devices known in the art that may be configured to store read-only operating system images as discussed in further detail below, as well as perform conventional mass storage device functionality known in the art. In addition, the storage subsystem 210*b* may include one or more Random Access Memory (RAM) device(s) 210*b* such as, for example, a RAM drive that, as discussed below, may be created by the BIOS 204 and used to install an operating system in the method 300 discussed below. While a specific computing device 200 is illustrated and described in FIG. 2, a wide variety of modification to the computing device 200 is envisioned as falling within the scope of the present disclosure, as virtually any computing device 200 with a BIOS or UEFI system is envisioned as benefiting from the teachings provided herein.

Figure 3:
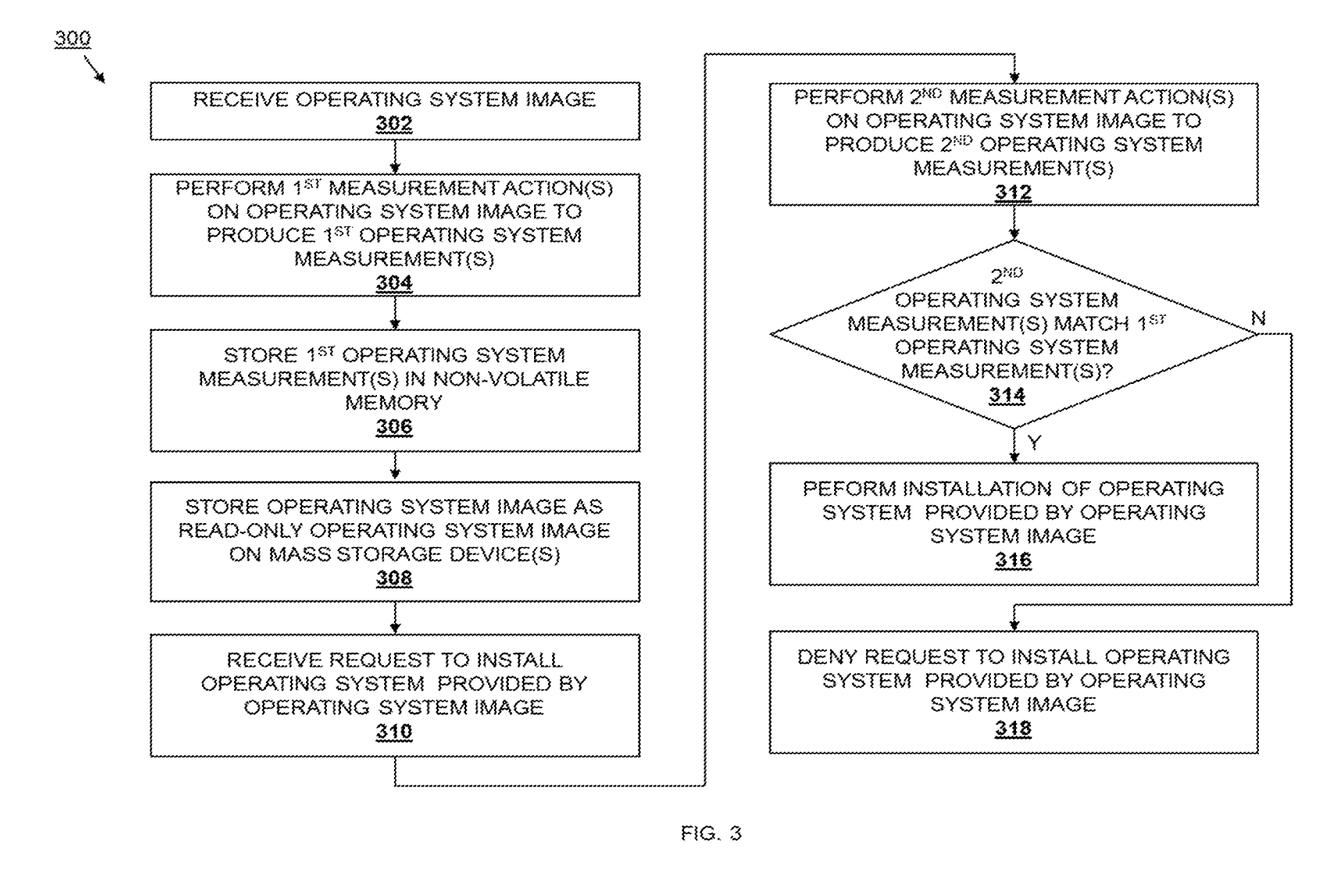
FIG. 3 is a flow chart illustrating an embodiment of a method for providing a secure live media boot.

Referring now to FIG. 3, an embodiment of a method 300 for providing secure live media booting is illustrated. As discussed in further detail below, the systems and methods of the present disclosure provide live media, which provides a complete bootable computer installation (e.g., in an .iso file) that includes an operating system for a computing device, as a read-only operating system image on a partition of a mass storage device that is included in computing device, and operates to ensure the integrity of that read-only operating system image for future booting processes/operating system installations by taking one or more first operating system measurements of that read-only operating system image, while in some embodiments encrypting those first operating system measurement(s), and storing them in a non-volatile memory (e.g., a TPM) in the computing device. In response to a subsequent request to perform a boot process using that operating system image (e.g., install an operating system associated with that operating system image), the systems and methods of the present disclosure may take one or more second operating system measurements of that read-only operating system image and compare those second operating system measurements to the previously-stored first operating system measurements (which in some embodiments may require decrypting the first operating system measurements). The booting process/operating system installation may then only be performed if second operating system measurements match the first operating system measurements. As such, the systems and methods of the present disclosure provide for a live media boot using live media that is stored on the computing device rather than having to provide that live media via an external drive each time a live media boot is desired, and ensure security of that live media boot by ensuring that no modifications have been made to the live media stored on the computing device (e.g., by comparing operating system measurements taken immediately prior to the live media boot and making sure they match operating system measurements taken when the live media was initially received).

Figure 4A:
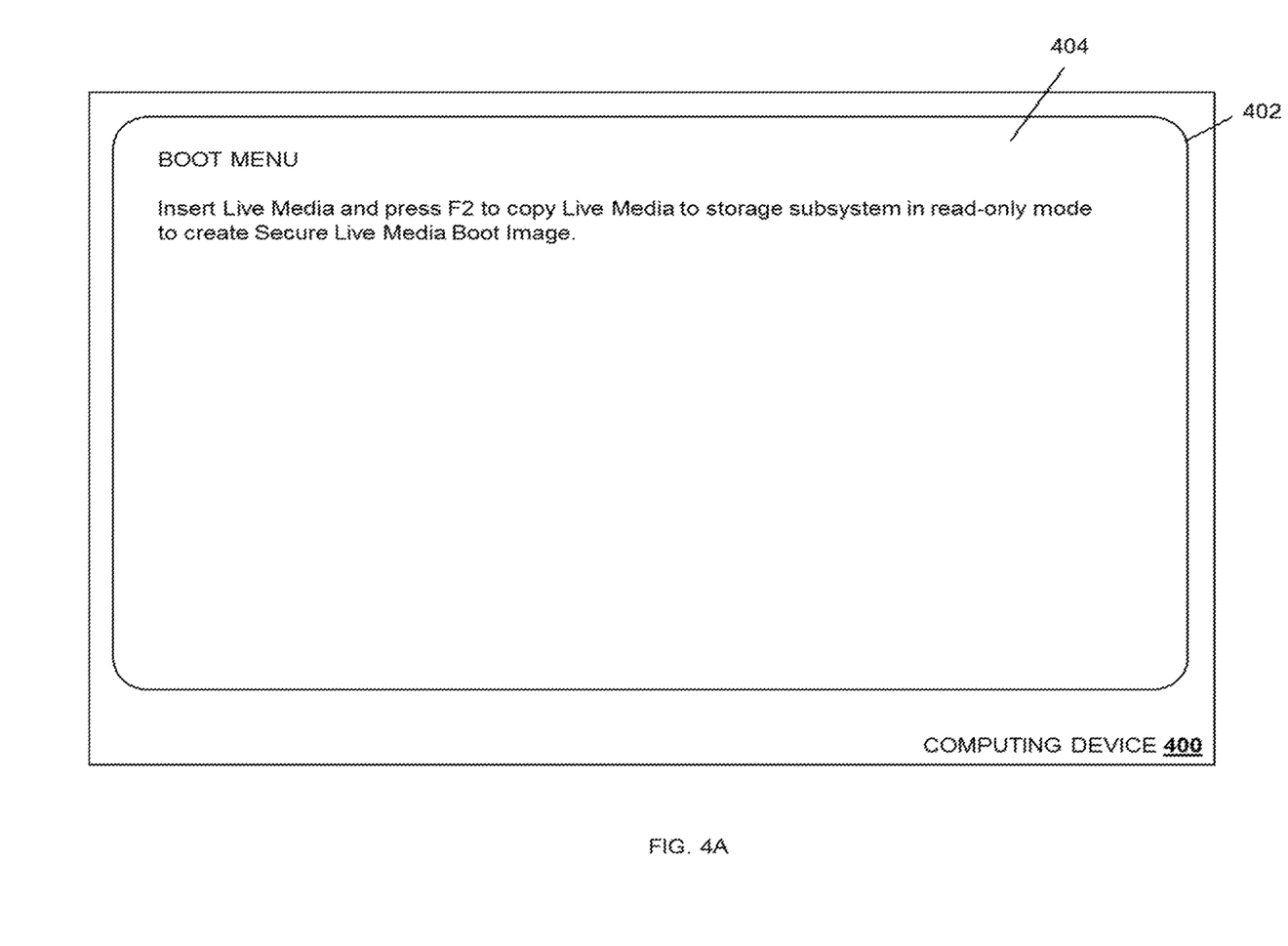
FIG. 4A is a screen shot illustrating an embodiment of a secure live media boot creation screen provided on the computing device of FIG. 2.

The method 300 begins at block 302 where an operating system image is received. In an embodiment, at block 302, the BIOS receives an operating system image. For example, a user may power up, reset, and/or otherwise initialize the computing device 300 and, during that initialization process, the user may provide an instruction to enter a boot menu (e.g., by pressing a key (e.g., the F12 key) during the BIOS boot process). In response, the computing device 300 may provide the user an option to create a secure live media boot image by copying an operating system image to the mass storage device(s) 210*a* in the storage subsystem 210. For example, FIG. 4A illustrates a computing device 400, which may be the computing device 300 discussed above with reference to FIG. 3, including a display 402 displaying a secure live media boot creation screen 404 that instructs the user to insert live media and provide an instruction (e.g., by pressing the F2 key) to copy the live media to the storage subsystem 210 in a read-only mode to create a secure live media boot image. While the secure live media boot creation screen 404 is illustrated and described as being provided in response to a user pressing a key during the BIOS boot process and then coupling live media to the computing device 300 in order to copy the live media to the mass storage device(s) 210*a*, in other embodiments, the user may couple the live media to the computing device 300 prior to initialization of the computing device 300 and, in response, the BIOS 204 may recognize that live media and automatically enter the boot menu to provide the secure live media boot creation screen 404. Furthermore, one of skill in the art in possession of the present disclosure will recognize that different combinations of actions may be performed in order for the operating system image to be received at block 302 while remaining within the scope of the present disclosure.

In an embodiment, at block 302, the user may couple live media such as, for example, Linux LiveCD or Read-only LiveUSB, to the external device connector(s) 208 that may include external media such as a compact disc (CD) or Universal Serial Bus (USB) drive that stores a complete bootable computer installation (e.g., in an .iso file) that includes the operating system image. However, in other embodiments, the external device connector(s) 208 may be used to connect to a network (e.g., Local Area Network (LAN), the Internet, etc.) through which the operating system image (e.g., the .iso file provided in the live media discussed above) may be available. As discussed above, the coupling of the live media to the external device connector(s) 208 may result in the BIOS 204 entering the boot menu during a BIOS boot process, may occur after the BIOS has entered the boot menu during the BIOS boot process (e.g., in response to an instruction by the user), and/or in a variety of manners that will fall within the scope of the present disclosure. At block 302, the BIOS 204 may then receive/retrieve the operating system image (e.g., in response to the instruction (e.g., the selection of the F2 key by the user) or automatically) through the external device connector(s) 208.

The method 300 then proceeds to block 304 where first measurement action(s) are performed on the operating system image to produce one or more first operating system measurement(s). In an embodiment, at block 304, the BIOS 204 may perform one or more first measurement actions on the operating system image received at block 302 in order to produce first operating system measurement(s). For example, at block 304 the BIOS 204 may perform a hashing operation on the operating system image received at block 302 in order to produce an operating system hash measurement. In embodiments when the hashing operation is performed, that hashing operation may be performed utilizing all of a plurality of data that provides the operating system image that was received at block 302. As such, all of the data received from the live media (e.g., all of the data that provides the .iso file, the entire operating system image, etc.) may be subject to a hashing operation that produces a measurement that indicates the values, structure, and/or any other characteristics of that data that was received prior to any opportunity to modify that data in any way. In another embodiments, in addition to and/or in place of the hashing operation performed to produce the first operating system measurements, other first measurement actions may be performed on the operating system image, and/or other data may be subject to the first measurement actions (e.g., user credentials, computing device identifiers, and/or other data that would be apparent to one of skill in the art in possession of the present disclosure) in order to produce the first operating system measurements at block 304. Furthermore, in some embodiments, .iso images may be retrieved through a network (e.g., the Internet) and may include their own measurements that were generated externally from the computing device. For example, an externally generated measurements such as an SHA256 measurements may be retrieved with the .iso file, stored in the BIOS NVRAM, and used substantially similarly as the first operating system measurements as discussed below.

The method 300 then proceeds to block 306 where the first operating system measurement(s) are stored in a non-volatile memory. In some embodiments, at block 306 the BIOS 204 may then store the first operating system measurements in the non-volatile memory 204a included in and/or coupled to the BIOS 204. In other embodiments, at block 306 the BIOS 204 may then store the first operating system measurements in the trusted platform module 206 (e.g., in Platform Configuration Registers (PCRs) in the trusted platform module 206). In embodiments that include the storage of the first operating system measurements in the trusted platform module 206, the BIOS 204 may operate to encrypt the first operating system measurements stored in the trusted platform module 206 utilizing trusted platform module functionality that may include, for example, compressing the first operating system image measurements and signing the compressed first operating system measurements with a secret key, and/or using other encryption techniques known in the art. However, while a few examples of storage of the first operating system measurements have been provided, one of skill in the art in possession of the present disclosure will recognize that the storage of the first operating system measurements in non-volatile memory may differ from those specifically described above, and combinations of the examples above (e.g., storage and/or encryption of different portions of the first operating system measurements in each of the non-volatile memory 204a and the trusted platform module 206) will fall within the scope of the present disclosure as well.

The method 300 then proceeds to block 308 where the operating system image is stored as a read-only operating system image on mass storage device(s). In an embodiment, at block 308, the BIOS 204 may store the operating system image received at block 302 as a read-only operating system image in the mass storage device 210a in the storage subsystem 210. For example, at block 308, the BIOS 204 may store the operating system image (e.g., the .iso file received/retrieved from the live media at block 302) on an EFI system partition that is included on the mass storage device(s) 210a (and, in some situations, may be created by the BIOS 204 at block 308 to store the operating system image). In another example, the BIOS 204 may store the operating system image (e.g., the .iso file received/retrieved from the live media at block 302) on a custom partition that is included on the mass storage device(s) 210a (and, in some situations, may be created by the BIOS 204 at block 308 to store the operating system image) and that may be accessible and under control of the operating system provided by the operating system image (discussed in further detail below) during OS runtime. While the storage of the operating system image in the EFI system partition may provide some security benefits, one of skill in the art in possession of the present disclosure will recognize that the accessibility of the operating system image in a custom partition that is under control of the operating system during OS runtime may be permissible due to the security provided via the first operating system measurements as is discussed in further detail below.

In either situation, the partition on which the operating system image is stored may be locked by the BIOS 204 as a read-only partition using a variety of techniques known in the art in order to provide the operating system image on the mass storage device(s) 210a as a read-only operating system image. In some embodiments, the BIOS 204 may operate to encrypt the read-only operating system image by, for example, compressing the read-only operating system image and signing the compressed read-only operating system image with a secret key, and/or using other encryption techniques known in the art. While a few specific examples of providing the operating system image as a read-only operating system image on a partition of mass storage device have been described, one of skill in the art in possession of the present disclosure will recognize that the operating system image may be provided as a read-only operating system image at block 308 using a variety of other techniques that will fall within the scope of the present disclosure.

The method 300 then proceeds to block 310 where a request is received to install an operating system provided by the operating system image. In an embodiment, subsequent to the storing of the first operating system image measurements in the non-volatile memory and the storing of the operating system image as a read-only operating system image in the storage subsystem, the BIOS 204 may receive a request to install the operating system provided by the operating system image (which may be stored as a read-only operating system image on the mass storage device(s) 210a as discussed above) on the computing device 300. Thus, in some embodiments, the first operating system measurements are produced and stored upon initial receipt of the operating system image and prior to any attempt to install its associated operating system on the computing device 300, and any subsequent request to install that operating system will be subject to the requirement that second operating system image measurement(s) match those first operating system measurements as discussed in further detail below. As such, if the operating system image received at block 302 is trusted as being an uncorrupted operating system image, and subsequent request to install its associated operating system may be trusted as well due to the measurement comparisons discussed below.

Figure 4B:
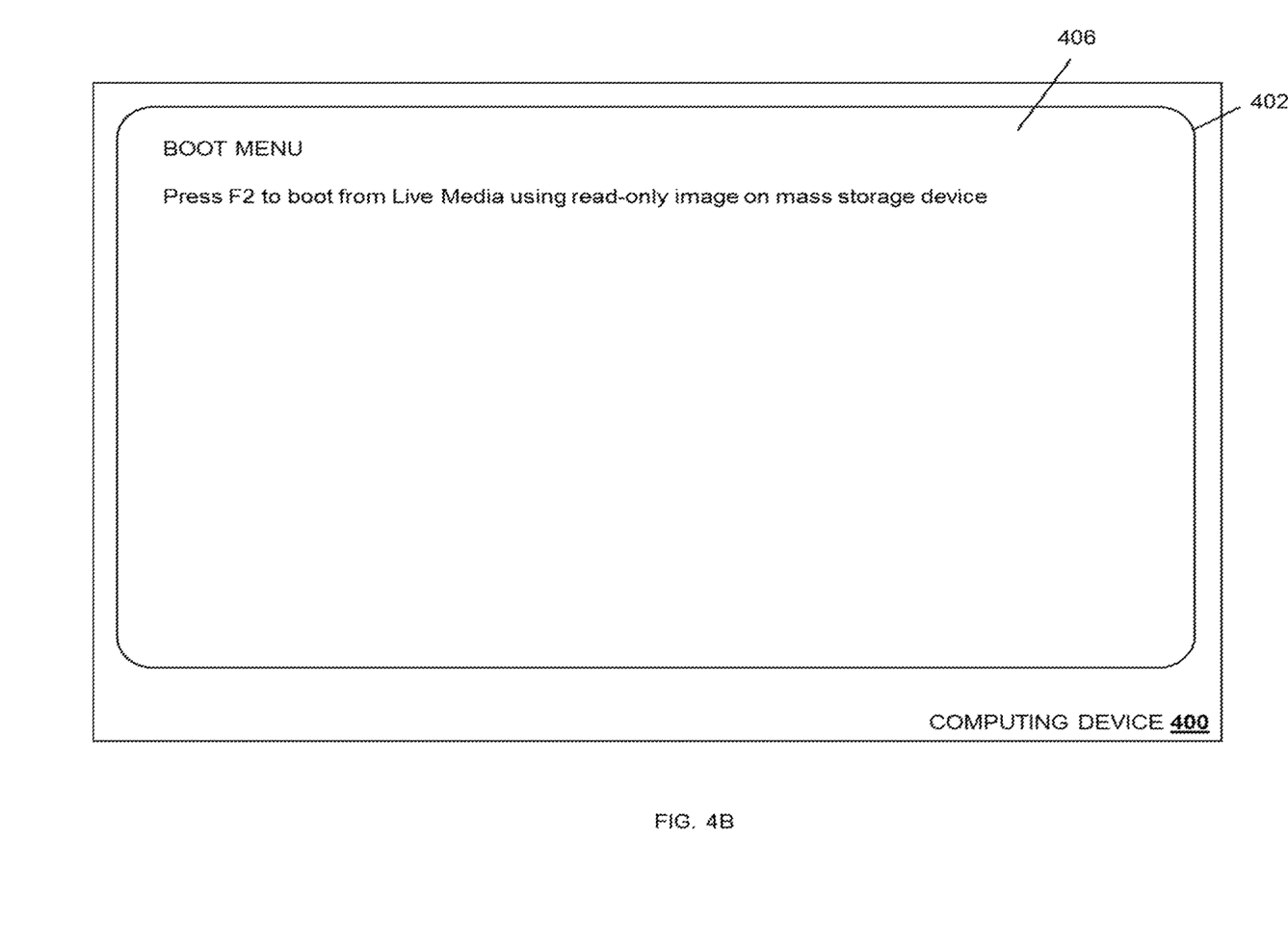
FIG. 4B is a screen shot illustrating an embodiment of a secure live media boot instruction screen provided on the computing device of FIG. 2.

For example, at block 310 a user may power up, reset, and/or otherwise initialize the computing device 300 and, during that initialization process, the user may provide an instruction to enter a boot menu (e.g., by pressing a key (e.g., the F12 key) during the BIOS boot process). In response, the computing device 300 may provide the user an option to boot using the read-only operating system image stored in the storage subsystem 210. For example, FIG. 4B illustrates the computing device 400, which may be the computing device 300 discussed above with reference to FIG. 3, including the display 402 displaying a secure live media boot instruction screen 406 that instructs the user to provide an instruction (e.g., by pressing the F2 key) to boot from live media stored on the mass storage device(s) 210a. While the secure live media boot instruction screen 406 is illustrated and described as being provided in response to a user pressing a key during the BIOS boot process, one of skill in the art in possession of the present disclosure will recognize that different combinations of actions may occur or may be performed (e.g., detection of a corruption of an operating system on the computing device 300 that is not provided by the read-only operating system image stored on the mass storage device(s) 210a, detection of a boot in a high security environment, etc.) in order to boot using the read-only operating system image stored on the mass storage device(s) 208 while remaining within the scope of the present disclosure. In some embodiments, at block 310, the user may provide the instruction (e.g., selecting the F2 key), and in some situations may provide user credentials (e.g., a username and password, a biometric scan, etc., that result in an authentication action to boot using the read-only operating system image on the mass storage device(s) 208) as part of the request to install the operating system provided by the read-only operating system image on the mass storage device(s) 210a.

The method 300 then proceeds to block 312 where second measurement action(s) are performed on the operating system image to produce second operating system measurement(s). In an embodiment, at block 304, the BIOS 204 may retrieve the operating system image by reading the read-only operating system image stored on the mass storage device(s) 210a, and prior to performing an installation of its associated operating system on the computing device 300, perform one or more second measurement actions on the operating system image in order to produce second operating system measurement(s). In embodiments where the read-only operating system image stored on the mass storage device 210a was encrypted, the BIOS 204 may operate to decrypt that read-only operating system image in order to perform the second measurement actions below. The second measurement action(s) will be the same as the first measurement actions, and may be performed at one or more times following the reading of the read-only operating system image from the mass storage device(s) 210a and up to the point that the installation of its associated operating system is installed on the computing device 300. As such, any modifications that may be made to the operating system image (e.g., by malicious software on the computing device 300) will operate to affect the second operating system measurements that are produced by the second measurements action(s).

For example, at block 312 the BIOS 204 may perform the hashing operation on the operating system image that was performed at block 304 in order to produce an operating system hash measurement that may be compared to the operating system hash measurement that was stored in the non-volatile memory at block 306. As such, that hashing operation may be performed utilizing all of a plurality of data that provides the operating system image that was read from the read-only operating system image stored in the mass storage device(s) 210a and that may be modified (e.g., by malicious software on the computing device 300) prior to installation of its associated operating system. For example, all of the data providing the operating system image read from the read-only operating system image stored on the mass storage device(s) 210a (e.g., all of the data that provides the .iso file, the entire operating system image, etc.) and possibly modified in preparation for installation of its associated operating system may be subject to a hashing operation that produces a measurement that indicates the values, structure, and/or any other characteristics of that data prior to installation of the operating system provided by that data. In another embodiments, in addition to and/or in place of the hashing operation performed to produce the second operating system measurements, any other second measurement actions and/or other data may be subject to the second measurement actions (e.g., user credentials, computing device identifiers, and/or other data that would be apparent to one of skill in the art in possession of the present disclosure) that correspond to the first measurement actions performed at block 304 in order to produce the second operating system measurements at block 312

The method 300 the proceeds to decision block 314 where it is determined whether the second operating system measurements match the first operating system measurements. In an embodiment, at decision block 314 the BIOS 204 may compare the second operating system measurements determined at block 312 to the first operating system measurements that were produced at block 304 and stored in the non-volatile memory at block 306 in order to determine whether the second operating system measurements match the first operating system measurements. In embodiments where the first operating system measurement(s) stored on non-volatile memory were encrypted, the BIOS 204 may operate to decrypt those first operating system measurement(s) in order to perform the comparison with the second operating system measurements discussed below. One of skill in the art in possession of the present disclosure will recognize that, when subject to a hashing operation or other measurement action, any modification made to the data that provides the operating system image that was read from the read-only operating system image stored on the mass storage device(s) 210a at block 308 will result in second operating system measurements that are different than the first operating system measurements that were produced at block 304 and stored in the non-volatile memory at block 306. As such, the comparison of the second operating system measurements with the first operating system measurements by the BIOS 204 will detect whether any modifications have been made to the operating system image that has been requested to be used to install an associated operating system on the computing device 300.

If, at decision block 314, it is determined that the second operating system measurements match the first operating system measurements, the method 300 then proceeds to block 316 where the installation of the operating system provided by the operating system image is performed. In an embodiment, at block 316, the BIOS 204 may determine that no modification has been made to the operating system image read from the read-only operating system image stored on the mass storage device(s) 210a and, in response, operate to utilize that operating system image to install its associated operating system on the computing device 300. For example, at block 316, the BIOS 204 may create the RAM device 210b (e.g., a RAM drive) on the mass storage device(s) 210a, copy the operating system image from the mass storage device(s) 210a to the RAM device 210b, and install the operating system associated with the operating system image using that operating system image that was copied to the RAM device 210b. In some example, at block 314 the BIOS 204 may operate to disable a portion of the storage subsystem (e.g., the mass storage device(s) 210a) and/or the external device connectors from accessing the other components of the computing device 300 in order to, for example, provide additional security (e.g., when the operating system being installed as a high security operating system provided to access high security systems). The BIOS 204 may then boot the operating system associated with the operating system image stored on the RAM device 210b using that operating system image. While a specific example of a performance of the installation of the operating system provided by the operating system image on the computing device has been described, one of skill in the art in possession of the present disclosure will recognize that other actions may be performed to install the operating system from the operating system image on the computing device while remaining within the scope of the present disclosure.

If, at decision block 314, it is determined that the second operating system measurements do not match the first operating system measurements, the method 300 then proceeds to block 318 where the request to install the operating system provided by the operating system image is denied. In an embodiment, at block 318, the BIOS may have determined that second operating system measurements do not match the first operating system measurements and, in response, the BIOS 204 will deny the request to install the operating system associated with the operating system image that was read from the read-only operating system image stored on the mass storage device(s) 210a. For example, in response to the user providing the instruction to boot the computing device 300/400 using the read-only operating system image on the mass storage device(s) 210a through the secure live media boot instruction screen 406, the BIOS 204 may determine that the operating system image read from that read-only operating system image on the mass store device(s) 210a have been modified and, in response, may inform the user that the request has been denied (e.g., by providing a message such as, for example, "your request to boot from Live Media using the read-only image on the mass storage device is denied, as the computing device and/or the read-only image on the mass storage device may have been compromised. Please contact a network administrator immediately"). In some embodiments, in response to the second operating system measurements not matching the first operating system measurements, the read-only operating system image stored on the mass storage device(s) 210a may be automatically erased or otherwise removed from the mass storage device(s) 210a. While specific examples of security actions taken in response to the second operating system measurements not matching the first operating system measurements have been described, one of skill in the art in possession of the present disclosure will recognize that other security actions may be performed while remaining within the scope of the present disclosure Thus, systems and methods have been described that provide an operating system image (e.g., in an .iso file) as a read-only operating system image on storage subsystem of a computing system upon an initial receipt of that operating system image, and operates to ensure the integrity of that read-only operating system image for future booting processes/operating system installations by taking one or more first operating system measurements of that read-only operating system image, and binding those first operating system measurements with the BIOS (e.g., by storing them in a non-volatile memory accessible by the BIOS during a secure live media boot). In response to a subsequent request to perform a boot process using that operating system image (e.g., install an operating system associated with that operating system image), the systems and methods of the present disclosure may take one or more second operating system measurements of the operating system image read from that read-only operating system image at one or more times prior to the installation of the operating system provided by that operating system image, and compare those second operating system measurements to the previously-stored first operating system measurements. The booting process/operating system installation may then only be performed if second operating system measurements match the first operating system measurements, thus providing a secure live media boot using an operating system image that is stored on the computing device rather than having to provide that operating system image via an external drive each time a live media boot is desired, while ensuring security of the resulting operating system on the computing device by ensuring that no modifications have been made to the operating system image prior to the installation of its associated operating system on the computing device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A secure live media boot system, comprising:
   a storage subsystem;
   a Trusted Platform Module (TPM);
   a non-volatile memory system that is separate from the storage subsystem and that is included in a Trusted Platform Module (TPM);
   at least one external device connector; and
   a Basic Input/Output System (BIOS) that is coupled to the at least one external device connector, the storage subsystem, and the TPM, wherein the BIOS is configured to:
   receive, during a BIOS boot process, an operating system image from an external device that is coupled to the external device connector and, in response, perform, during the BIOS boot process, a first measurement action on the operating system image prior to performing an installation of an operating system associated with the operating system image on a computing device that includes the BIOS, wherein the performance of the first measurement action produces a first operating system image measurement;
   provide, during the BIOS boot process, the first operating system image measurement to the TPM, wherein the TPM is configured to encrypt and store the first operating system measurement in the non-volatile memory system;
   store, during the BIOS boot process, the operating system image as a read-only operating system image on the storage subsystem;
   receive a request to install the operating system provided by the operating system image on the computing device subsequent to storing the first operating system image measurement in the non-volatile memory system and, in response, perform a second measurement action on the operating system image stored as a read-only operating system image on the storage subsystem in order to produce a second operating system measurement; and
   determine that the second operating system measurement matches the first operating system measurement and, in response, perform an installation of the operating system associated with the operating system image on the computing device.

2. The system of claim 1, wherein the non-volatile memory system is included in the BIOS.

3. The system of claim 1, wherein each of the first measurement action and the second measurement action are performed on all of a plurality of data that provides the operating system image.

4. The system of claim 1, wherein the BIOS is configured to:
encrypt the read-only operating system image that is stored on the storage subsystem, wherein the performing the installation of the operating system associated with the operating system image on the computing device includes decrypting the read-only operating system image.

5. The system of claim 1, wherein the TPM includes a cryptoprocessor that is configured to encrypt the first operating system measurement with a key.

6. The system of claim 1, wherein the BIOS is configured to perform the installation of the operating system associated with the operating system image on the computing device by:
creating a Random Access Memory (RAM) drive;
copying the operating system image from the storage subsystem to the RAM drive;
disabling at least a portion of the storage subsystem and the at least one external device connector from accessing at least one component in the computing device; and
installing the operating system associated with the operating system image on the computing device using the operating system image that was copied to the RAM drive.

7. An Information Handling System (IHS), comprising:
a mass storage device;
a Trusted Platform Module (TPM);
a non-volatile memory subsystem that is separate from the mass storage device and that is included in the TPM;
an external device connector; and
a Basic Input/Output System (BIOS) that is coupled to the mass storage device, the TPM, and the external device connector, wherein the BIOS is configured to:
receive, during a BIOS boot process, an operating system image from an external device that is coupled to the external device connector and, in response, perform, during the BIOS boot process, a first measurement action on the operating system image prior to performing an installation of an operating system associated with the operating system image to produce a first operating system image measurement;
provide, during the BIOS boot process, the first operating system image measurement to the TPM, wherein the TPM is configured to encrypt and store the first operating system measurement in the non-volatile memory subsystem;
store, during the BIOS boot process, the operating system image as a read-only operating system image on the mass storage device;
receive a request to install the operating system provided by the operating system image subsequent to storing the first operating system image measurement in the non-volatile memory subsystem and, in response, perform a second measurement action on the operating system image in order to produce a second operating system measurement; and
determine that the second operating system measurement matches the first operating system measurement and, in response, perform an installation of the operating system associated with the operating system image.

8. The IHS of claim 7, wherein the non-volatile memory subsystem is included in the BIOS.

9. The IHS of claim 7, wherein each of the first measurement action and the second measurement action are performed on all of a plurality of data that provides the operating system image.

10. The IHS of claim 7, wherein the BIOS is configured to:
encrypt the read-only operating system image that is stored on the mass storage device, wherein the performing the installation of the operating system associated with the operating system image includes decrypting the read-only operating system image.

11. The IHS of claim 7, wherein the TPM includes a cryptoprocessor that is configured to encrypt the first operating system measurement with a key.

12. The IHS of claim 7, wherein the BIOS is configured to perform the installation of the operating system associated with the operating system image by:
creating a Random Access Memory (RAM) drive;
copying the operating system image from the mass storage device to the RAM drive;
disabling the mass storage device and the external device connector; and
installing the operating system associated with the operating system image using the operating system image that was copied to the RAM drive.

13. The IHS of claim 7, wherein the BIOS is provided by a Unified Extensible Firmware Interface (UEFI).

14. A method for providing secure live media booting, comprising:
receiving, during a Basic Input/Output System (BIOS) boot process by a BIOS through at least one external device connector, an operating system image and, in response, performing, by the BIOS during the BIOS boot process and prior to performing an installation of an operating system associated with the operating system image on a computing device, a first measurement action on the operating system image to produce a first operating system image measurement;
providing, by the BIOS during the BIOS boot process, the first operating system image measurement to a Trusted Platform Module (TPM), wherein the TPM is configured to encrypt and store the first operating system measurement in a non-volatile memory subsystem that is included in the TPM;
storing, by the BIOS during the BIOS boot process, the operating system image as a read-only operating system image on a storage subsystem that is separate from the non-volatile memory subsystem;
receiving, by the BIOS from an input device on the computing device subsequent to storing the first operating system image measurement in the non-volatile memory subsystem, a request to install the operating system provided by the operating system image and, in response, performing a second measurement action on the operating system image in order to produce a second operating system measurement; and
determining, by the BIOS, that the second operating system measurement matches the first operating system measurement and, in response, performing an installation of the operating system associated with the operating system image on the computing device.

15. The method of claim 14, wherein the non-volatile memory subsystem is included in the BIOS.

16. The method of claim 14, wherein each of the first measurement action and the second measurement action are performed on all of a plurality of data that provides the operating system image.

17. The method of claim 14, further comprising:
encrypting, by the BIOS, the read-only operating system image that is stored on the storage subsystem, wherein the performing the installation of the operating system associated with the operating system image on the computing device includes decrypting the read-only operating system image.

18. The method of claim 14, wherein the TPM includes a cryptoprocessor that is configured to encrypt the first operating system measurement with a key.

19. The method of claim 14, wherein the performing the installation of the operating system associated with the operating system image on the computing device includes:
creating, by the BIOS, a Random Access Memory (RAM) drive;
copying, by the BIOS, the operating system image from the storage subsystem to the RAM drive;
disabling, by the BIOS, at least a portion of the storage subsystem and the at least one external device connector from accessing at least one component in the computing device; and
installing, by the BIOS, the operating system associated with the operating system image on the computing device using the operating system image that was copied to the RAM drive.

20. The method of claim 14, wherein the BIOS is provided by a Unified Extensible Firmware Interface (UEFI).

\* \* \* \* \*